United States Patent [19]

Zenger, Sr.

[11] 4,180,012

[45] Dec. 25, 1979

[54] FISH EGG INCUBATOR WITH FRY RELEASE MEANS

[76] Inventor: Harold H. Zenger, Sr., P.O. Box 713, Juneau, Ak. 99802

[21] Appl. No.: 846,908

[22] Filed: Dec. 12, 1977

[51] Int. Cl.² .............................................. A01K 61/00
[52] U.S. Cl. ........................................................ 119/3
[58] Field of Search ............................................ 119/3

[56] References Cited

U.S. PATENT DOCUMENTS

| 166,413 | 8/1875 | Roth | 119/3 |
|---|---|---|---|
| 3,024,764 | 3/1962 | Brittain et al. | 119/3 |
| 3,028,837 | 4/1962 | Tuttle | 119/3 |
| 4,014,293 | 3/1977 | Salter | 119/3 |

*Primary Examiner*—Hugh R. Chamblee
*Attorney, Agent, or Firm*—Christopher Duffy

[57] ABSTRACT

The eggs are incubated in a stack of relatively spaced liquid containers, each of which has a basin therein through which the incubation liquid undergoes upward flow and then weirs over opposing sides of the basin into outflow chambers from where it discharges into the container therebelow. In the lower container, the liquid is introduced into inflow chambers at opposite ends of the basin, where it flows downward through ports into a plenum and then upwardly into the basin of the lower container and over the sides of the same in the aforedescribed manner. At the fry release stage, a gate is removed at the top of one of the opposing sides of each basin, and in the space between the containers there is a spigot-like conduit means which discharges the liquid from one of the outflow chambers of the upper container into the lower container at a delivery point on an arc passing vertically above the basin of the lower container.

16 Claims, 7 Drawing Figures

FISH EGG INCUBATOR WITH FRY RELEASE MEANS

THE INVENTION IN GENERAL

This invention relates to an incubator for the commercial production of fish fry including Pacific Salmon fry. The incubator is especially designed for the Salmon species Oncorhynchus gorbuscha and Oncorhynchus keta.

In the incubator, there is a liquid container having an open-topped recess therein for the liquid and a quadrilateral frame in the recess which is spaced inwardly from the periphery of the recess on all sides thereof and defines a central basin for the container. There is also a pair of inflow chambers formed in the recess on the opposite ends of the frame and a pair of outflow chambers formed in the recess on the opposite sides of the frame. The inflow chambers communicate with the basin through entry ports formed between the bottom of the container and the frame, and the basin has a false bottom therein to support the fish eggs at a level below the top of the frame so that the fry are contained in the basin when the eggs hatch. Moreover, the false bottom is apertured and forms a plenum therebelow which interconnects the ports with the basin so that when incubation liquid is introduced to the inflow chambers to a level commensurate with the top of the frame on the aforesaid opposing sides thereof, the liquid flows downward through the ports into the plenum and thence upwardly into the basin through the apertures in the false bottom thereof, and thereafter weirs over the tops of the aforesaid opposing sides of the frame into the outflow chambers. There are outlets in the outflow chambers, moreover, to discharge the liquid therefrom, and a pair of conduit means is connected with the outlets to deliver the discharged liquid to points vertically below the inflow chambers so that when two or more such containers are stacked on top of one another with the respective inflow chambers thereof in registry with one another, the liquid is delivered from the relatively upper container into the inflow chambers of the relatively lower container for transmission of the liquid downward through the stack in the same pattern of flow from one container to the next.

In one embodiment of the invention, there is a gate shiftably mounted in the top portion of the frame on one of the opposing sides thereof, whereby the fry can be released from the basin in a controlled manner after the eggs have hatched. The gate is apertured, and one opposing side of the frame is crenelated and there is a groove scribed in the crenel thereof in which the gate is removably seated. In fact, there is a fry control gate shiftably mounted in the top portion of the frame on each of the aforesaid opposing sides thereof.

In the foregoing embodiment, moreover, one of the conduit means is spigot-like in construction and depends from the container independently of the bottom thereof at a reach adapted to place the delivery point thereof in coincidence with an arc about the respective outlet thereof passing vertically below the basin so that in the stack of containers, the arc passes commensurately above the basin of the relatively lower container. More particularly, the container has spacer means depending from the bottom thereof which are adapted to define a ventricular cavity below the bottom and to mate with the top of the relatively lower container in the stack, the outlets are disposed in the bottom of the container adjacent the corners of the frame, and the conduit means include a spigot-like extension which depends from the bottom within the cavity and extends relatively peripherally inwardly of the container from the respective outlet thereof. In fact, there is a spigot-like extension depending from the bottom in connection with each of the outlets.

Furthermore, in the foregoing embodiment, there is an alevin nesting substrate disposed on the false bottom of the basin in the path of the liquid flow through the apertures thereof. There is also a plugged back flush hole opening through the container at a point adjacent one of the inflow chambers and disposed opposite the entry port by which the aforesaid one inflow chamber communicates with the basin.

BRIEF DESCRIPTION OF THE DRAWINGS

These features will be better understood by reference to the accompanying drawings wherein I have illustrated an incubator constructed in accordance with my invention.

DESCRIPTION OF THE PREFERRED EMBODIMENT

Figure 1:
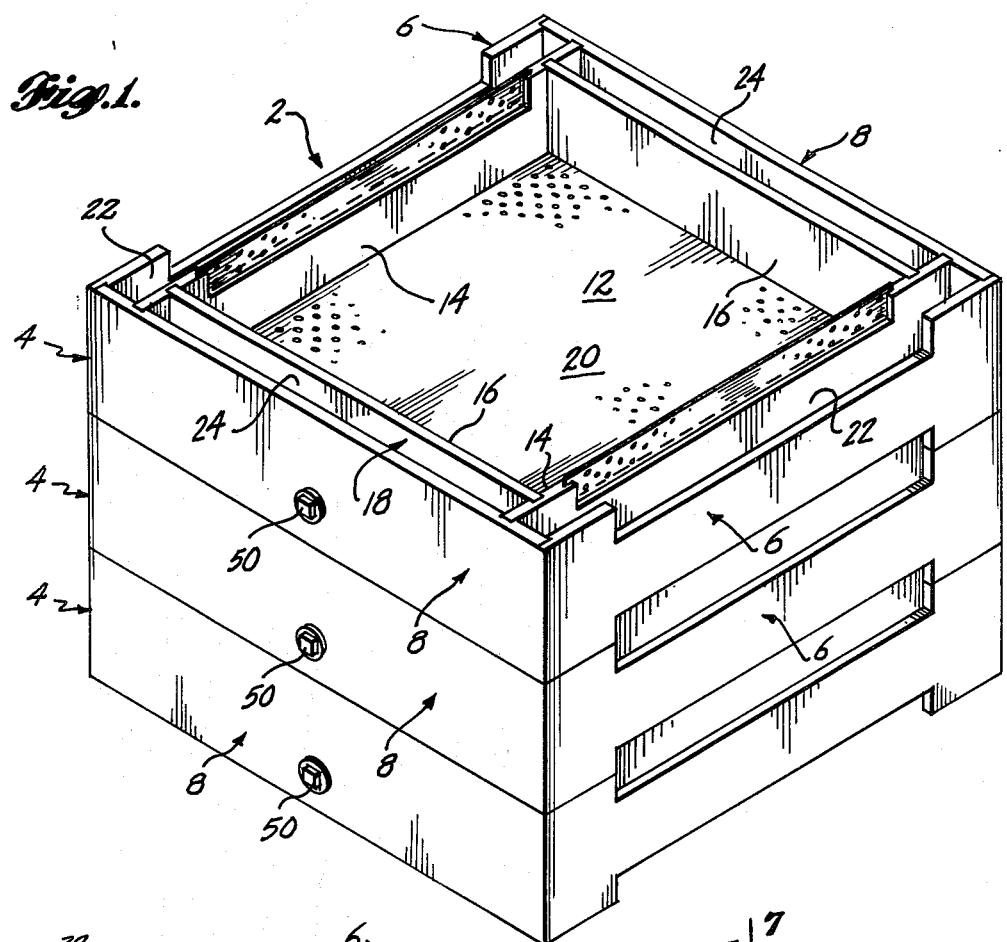
FIG. 1 is a perspective view of the incubator.
Figure 2:
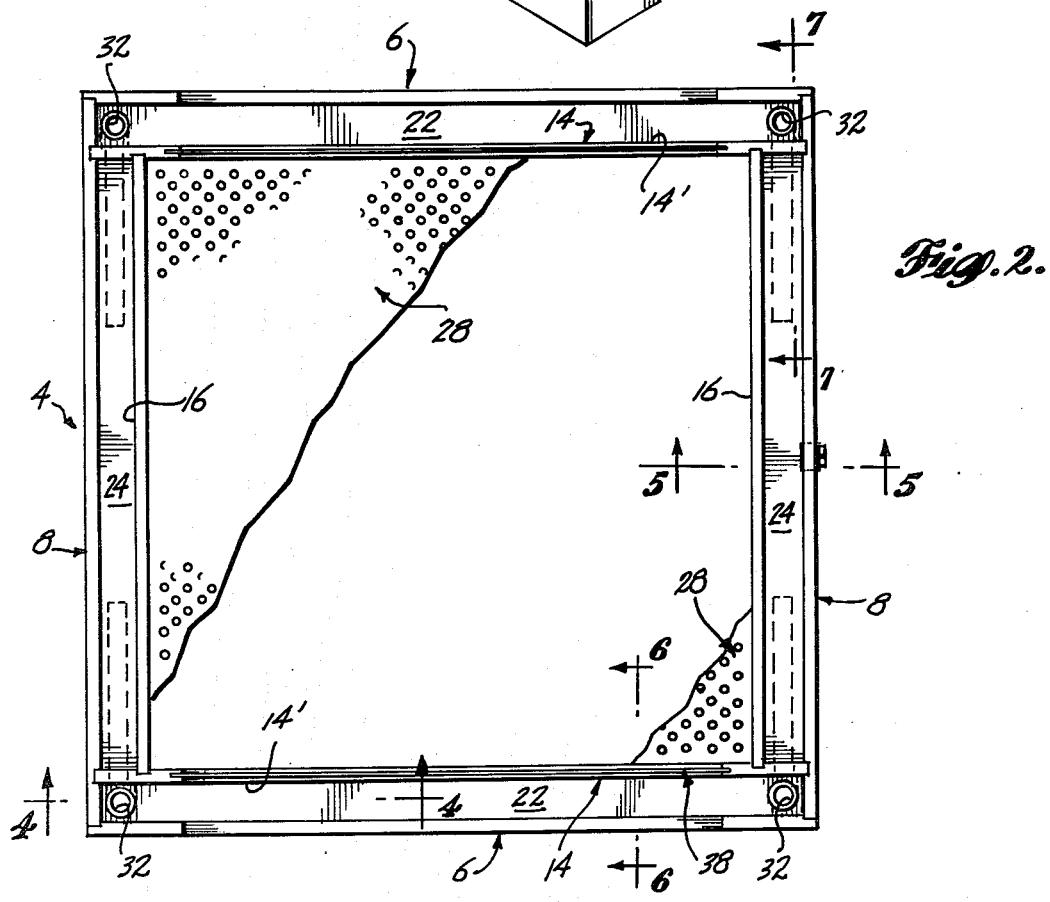
FIG. 2 is a part cutaway plan view of one container in the incubator.

Referring to the drawings, it will be seen that the incubator 2 comprises a stack of tray sized liquid containers 4, each of which has pairs of relatively oppositely disposed side walls 6 and relatively oppositely end walls 8 upstanding from the bottom 10 thereof to form a recess 12 for the liquid. In addition, each container 4 has pairs of relatively oppositely disposed baffles 14 and 16 mounted upright in the recess 12 to form a quadrilateral frame 18 therein which is spaced peripherally inwardly from the pairs of walls 6 and 8 and defines a central basin 20 for the container. One pair of the baffles, 14, is upstanding from the bottom 10 of the container and extends between the end walls 8 of the container to cooperate with the side walls 6 thereof in forming outflow chambers 22 on the opposite sides of the basin. The other pair of baffles, 16, is spaced above the bottom of the container and extends between the one pair of baffles 14 to cooperate with the end walls 8 of the container in forming inflow chambers 24 on the opposite ends of the basin. The inflow chambers 24 communicate with the basin 20 through entry ports 26 formed by the spaces between the bottom of the container and the bottoms 16' of the other pair of baffles 16. Moreover, there is a perforated plate 28 connected to the frame 18 within the basin 20 to form a false bottom for the basin and a plenum 30 therebelow between the plate 28 and the bottom 10 of the container. There are also discharge outlets 32 in the outflow chambers 22. The outlets 32 are disposed in the bottom 10 of the container adjacent the corners thereof.

The side walls 6 and baffles 14 of the container are crenelated to a corresponding depth and there are grooves 34 scribed in the sides and bottoms of the crenels 36 in the baffles 14. Perforated fry control gates 38 are removably seated in the grooves 34. The outsides 14' of the baffles 14 form liquid aerator faces.

All four walls 6, 8 of the container depend below the bottom 10 thereof at the corners of the container, so as to form an open sided ventricular cavity 40 below the bottom. The outlets 32 have right angular elbows 42 depending therefrom within the cavity 40, and the elbows are equipped with elongated extension pipes 44 thereon which terminate at points disposed vertically below the inflow chambers 24 of the container, as well as on arcs passed about the respective outlets vertically below the basin 20.

Figure 3:
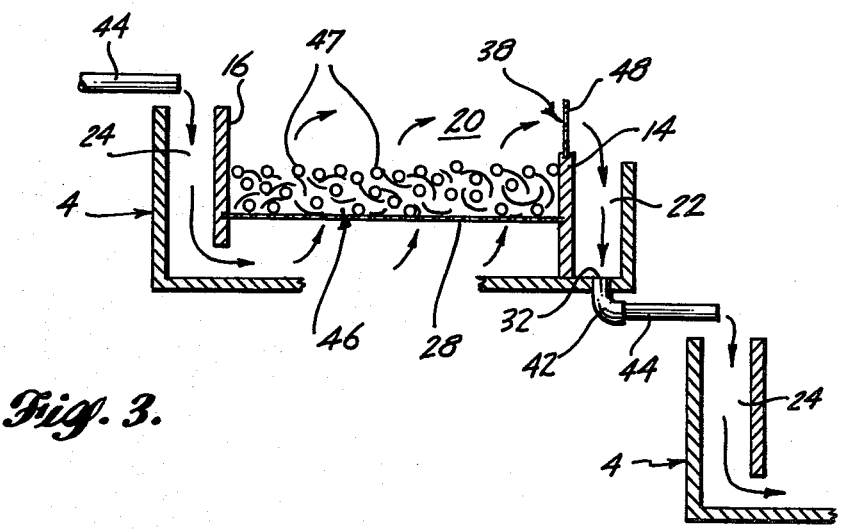
FIG. 3 is a schematic representation of the liquid flow through the incubator.
Figure 4:
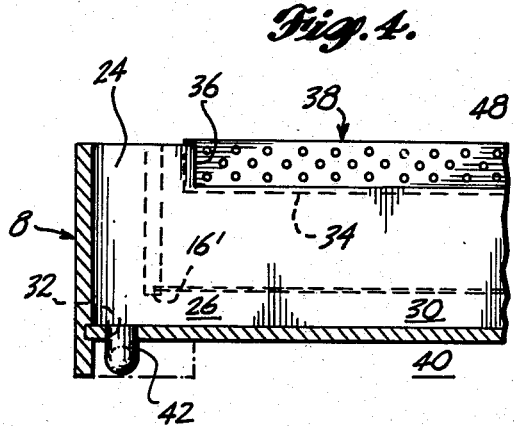
FIG. 4 is a part cross sectional view of the container along the line 4—4 of FIG. 2.
Figure 5:
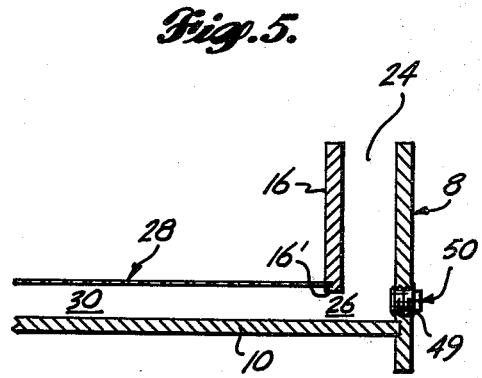
FIG. 5 is a part cross sectional view of the container along the line 5—5 of FIG. 2.
Figure 6:
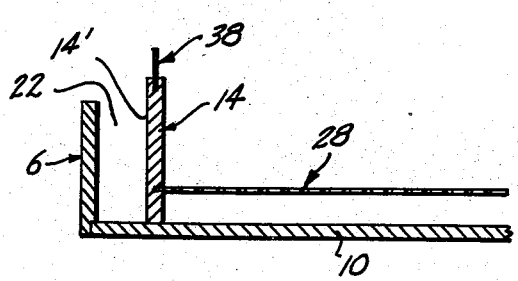
FIG. 6 is a part cross sectional view of the container along the line 6—6 of FIG. 2.
Figure 7:
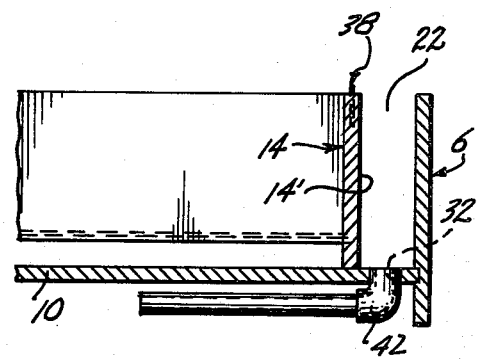
FIG. 7 is a part cross sectional view of the container along the line 7—7 of FIG. 2.

Referring now to FIG. 3 in particular, it will be seen that in use, a substrate 46, for example of artificial plastic, is placed on the perforated plate 28 of each container 4 as a hatching medium for the fish eggs. Then a given stocking density of fertilized eggs 47 is evenly distributed over each substrate and the containers 4 are stacked on top of one another with the respective inflow chambers 24 thereof in registry with one another. Incubation liquid is introduced to the inflow chambers 24 of the topmost container, and to a level commensurate with the tops of the baffles 14, i.e., the perforations 48 in the fry control gates 38. The liquid flows downwardly in the chambers 24 through the ports 26 into the plenum 30 and thence upwardly into the basin 20 through the false bottom 28 thereof. In the basin, the liquid then weirs over the tops of the baffles 14 in the sense of flowing through the perforations 48 into the outflow chambers 22. Then the liquid discharges from the chambers 22 through the outlets 32 and the pipes 44 into the inflow chambers 24 of the container therebelow. See the arrows in FIG. 3. In the latter container, the flow pattern is repeated. Meanwhile, the distributed eggs 47 proceed to hatch. The resulting alevin bury themselves within the substrate 46 near the perforated plates 28 at the bottoms of the basins 20 of the containers and they remain buried until their yolk sacs have been absorbed. They then emerge as fry and having "buttoned up", that is, their yolk sacs having been completely absorbed, the young adults are permitted to migrate from the containers with the removal of the control gates 38. Progressively, the incubator stack can then be broken down with each individual container 4 being cleaned with any household detergent and water. Also, the plastic substrates 46 can be washed in a conventional washing machine and used again in the incubator during the following season.

Typically, the containers 4 are each four feet by four feet in plan and one foot in depth. They may be built from three-quarter inch plywood. The perforated plates 28 are typically aluminum and have 5/64 inch holes on half inch staggered centers. All wood joints are datoed and glued.

A back flush hole 49 and plug 50 are provided in each container, the latter being PVC threaded one inch rod.

The outlets 32 are defined by one inch PVC pipe and the extension pipes 44 are typically ten inch long PVC pipe to bring the liquid back toward the center of each container for proper flow into the next container therebelow.

I claim:

1. In a fish egg incubator, a liquid container having an open-topped recess therein for the liquid and a quadrilateral frame in the recess which is spaced inwardly from the periphery of the recess on all sides thereof and defines a central basin for the container, there being a pair of inflow chambers formed in the recess on the opposite ends of the frame and a pair of outflow chambers formed in the recess on the opposite sides of the frame, said inflow chambers communicating with the basin through entry ports formed between the bottom of the container and the frame and said basin having a false bottom therein to support the fish eggs at a level below the top of the frame so that the fry are contained in the basin when the eggs hatch, and said false bottom being apertured and forming a plenum therebelow which interconnects the ports with the basin so that when incubation liquid is introduced to the inflow chambers to a level commensurate with the top of the frame on the aforesaid opposing sides thereof, the liquid flows downward through the ports into the plenum and thence upwardly into the basin through the apertures in the false bottom thereof, and thereafter weirs over the tops of the aforesaid opposing sides of the frame into the outflow chambers, there being outlets in the outflow chambers to discharge the liquid therefrom and a pair of conduit means connected with the outlets to deliver the discharged liquid to points vertically below the inflow chambers so that when two or more such containers are stacked on top of one another with the respective inflow chambers thereof in registry with one another, the liquid is delivered from the relatively upper container into the inflow chambers of the relatively lower container for transmission of the liquid downward through the stack in the same pattern of flow from one container to the next.

2. The incubator according to claim 1 wherein there is a gate shiftably mounted in the top portion of the frame on one of the opposing sides thereof, whereby the fry can be released from the basin in a controlled manner after the eggs have hatched.

3. The incubator according to claim 2 wherein the gate is apertured.

4. The incubator according to claim 3 wherein the one opposing side of the frame is crenelated and there is a groove scribed in the crenel thereof in which the gate is removably seated.

5. The incubator according to claim 2 wherein there is a fry control gate shiftably mounted in the top portion of the frame on each of the aforesaid opposing sides thereof.

6. The incubator according to claim 1 wherein one of the conduit means is spigot-like in construction and depends from the container independently of the bottom thereof at a reach adapted to place the delivery point thereof in coincidence with an arc about the respective outlet thereof passing vertically below the basin so that in the stack of containers, the arc passes commensurately above the basin of the relatively lower container.

7. The incubator according to claim 1 wherein the container has spacer means depending from the bottom thereof which are adapted to define a ventricular cavity below the bottom and to mate with the top of the relatively lower container in the stack, and wherein the outlets are disposed in the bottom of the container adjacent the corners of the frame and the conduit means include a spigot-like extension which depends from the bottom within the cavity and extends relatively peripherally inwardly of the container from the respective outlet thereof.

8. The incubator according to claim 7 wherein there is a spigot-like extension depending from the bottom in connection with each of the outlets.

9. The incubator according to claim 1 wherein there is an alevin nesting substrate disposed on the false bottom of the basin in the path of the liquid flow through the apertures thereof.

10. The incubator according to claim 1 wherein there is a plugged back flush hole opening through the container at a point adjacent one of the inflow chambers and disposed opposite the entry port by which said one inflow chamber communicates with the basin.

11. In a fish egg incubator, a tray sized liquid container having pairs of relatively oppositely disposed side walls and relatively oppositely disposed end walls upstanding from the bottom thereof to form a recess for the liquid, and pairs of relatively oppositely disposed baffles mounted upright in the recess to form a quadrilateral frame therein which is spaced peripherally inwardly from the pairs of walls and defines a central basin for the container, one pair of said baffles being upstanding from the bottom of the container and extending between the end walls thereof to cooperate with the side walls thereof in forming outflow chambers on the opposite sides of the basin, and the other pair of baffles being spaced above the bottom of the container and extending between the one pair of baffles to cooperate with the end walls of the container in forming inflow chambers on the opposite ends of the basin, said inflow chambers communicating with the basin through entry ports formed by the spaces between the bottom of the container and the bottoms of the other pair of baffles, and there being a perforated plate connected to the frame within the basin to form a false bottom for the basin and a plenum therebelow which is disposed between the plate and the bottom of the container and interconnects the ports with the basin, and liquid outlets in the outflow chambers having spigot-like conduit means depending therefrom independently of the bottom of the container at a reach adapted to place the delivery points thereof vertically below the inflow chambers and in coincidence with an arc about the respective outlets thereof passing vertically below the basin.

12. The incubator according to claim 11 wherein there is a fry control gate shiftably mounted in the top portion of one of the aforesaid one pair of baffles, and spacer means depending from the bottom of the container which are adapted to define a ventricular cavity below the bottom, within which the spigot-like conduit means depend from the bottom and extend relatively peripherally inwardly of the container from the respective outlets thereof.

13. A fish egg incubator comprising a stack of relatively spaced liquid containers, each having an open-topped recess therein for the liquid and a quadrilateral frame in the recess which is spaced inwardly from the periphery of the recess on all sides thereof and defines a central basin for the container, there being a pair of inflow chambers formed in the recess on the opposite ends of the frame and a pair of outflow chambers formed in the recess on the opposite sides of the frame, said inflow chambers communicating with the basin through entry ports formed between the bottom of the container and the frame and said basin having a false bottom therein to support the fish eggs at a level below the top of the frame so that the fry are contained in the basin when the eggs hatch, said false bottom being apertured and forming a plenum therebelow which interconnects the ports with the basin so that when incubation liquid is introduced to the inflow chambers of the relatively upper container, to a level commensurate with the top of the frame on the aforesaid opposing sides thereof, the liquid flows downward through the ports, into the plenum and thence upwardly into the basin through the apertures in the false bottom thereof, and thereafter weirs over the tops of the aforesaid opposing sides of the frame into the outflow chambers of the relatively upper container, there being outlets in the outflow chambers to discharge the liquid therefrom and a pair of spigot-like conduit means connected with the outlets and depending from the relatively upper container independently of the bottom thereof and in the space between the containers to deliver the discharged liquid to points vertically above the inflow chambers of the relatively lower container so that the liquid is transmitted downward through the stack in the same pattern of flow from one container to the next.

14. The incubator according to claim 13 wherein one of the spigot-like conduit means has a reach adapted to place the delivery point thereof in coincidence with an arc about the respective outlet thereof passing vertically above the basin of the relatively lower container.

15. The incubator according to claim 14 wherein there is a gate shiftably mounted in the top portion of the frame of the relatively upper container on one of the opposing sides thereof, whereby the fry can be released from the basin thereof in a controlled manner after the eggs have hatched.

16. The incubator according to claim 14 wherein the relatively upper container has spacer means depending from the bottom thereof which are adapted to define a ventricular cavity below the bottom and to mate with the top of the relatively lower container, and wherein the outlets are disposed in the bottom of the relatively upper container adjacent the corners of the frame therein and the conduit means depend from the bottom within the cavity and extend relatively peripherally inwardly of the containers from the respective outlets thereof.

* * * * *